United States Patent
Kwon et al.

(10) Patent No.: US 8,705,347 B2
(45) Date of Patent: Apr. 22, 2014

(54) METHOD FOR ELECTING RING MANAGER OF RING TOPOLOGY NETWORK, AND NODE

(75) Inventors: Young Chan Kwon, Suwon (KR); Soo Gang Lee, Anyang (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 203 days.

(21) Appl. No.: 13/091,038

(22) Filed: Apr. 20, 2011

(65) Prior Publication Data
US 2011/0274010 A1 Nov. 10, 2011

(30) Foreign Application Priority Data
May 6, 2010 (KR) .................. 10-2010-0042662

(51) Int. Cl.
H04L 12/26 (2006.01)
H04L 12/56 (2006.01)
G06F 15/16 (2006.01)
H04L 12/24 (2006.01)
H04L 12/423 (2006.01)

(52) U.S. Cl.
CPC ......... H04L 41/5025 (2013.01); *H04L 12/2602* (2013.01); *H04L 12/423* (2013.01); *H04L 41/044* (2013.01); *H04L 47/125* (2013.01)
USPC ............................. 370/222; 370/403; 709/251

(58) Field of Classification Search
USPC .............. 370/222, 400, 403; 709/251; 398/59
See application file for complete search history.

(56) References Cited

U.S. PATENT DOCUMENTS

| 6,363,416 B1 * | 3/2002 | Naeimi et al. ................ 709/209 |
| 6,954,436 B1 * | 10/2005 | Yip et al. ...................... 370/254 |
| 7,675,869 B1 * | 3/2010 | Anker et al. .................. 370/255 |
| 2004/0008719 A1 | 1/2004 | Ying |
| 2006/0215546 A1 * | 9/2006 | Tochio .......................... 370/218 |

(Continued)

FOREIGN PATENT DOCUMENTS

| CN | 1925446 | 3/2007 |
| JP | 2010-87551 | 4/2010 |
| JP | 2010087551 | 4/2010 |
| KR | 10-2008-0071850 | 8/2008 |

OTHER PUBLICATIONS

The State Intellectual Property Office of the People's Republic of China Serial No. 201110122204.9, Office Action dated May 6, 2013, 7 pages.

*Primary Examiner* — Dang Ton
*Assistant Examiner* — Ryan Kavleski
(74) *Attorney, Agent, or Firm* — Lee, Hong, Degerman, Kang & Waimey

(57) ABSTRACT

A method for electing a ring manager of ring topology network and a node are disclosed, where, to this end, a node responsible for electing the ring manager periodically requests each node of diagnostic information on packet traffic and receives the diagnostic information on packet traffic from each node, newly elects a node capable of performing a ring manager role, and informs each node of information on the newly elected ring manager, whereby the ring network can be more effectively operated because the ring manager is elected based on network load status that changes in real time even in the course of a ring network being initially set up and operated responsive to structural conditions including hop count of each nod and MAC node.

10 Claims, 10 Drawing Sheets

(56) References Cited

U.S. PATENT DOCUMENTS

| | | |
|---|---|---|
| 2007/0002773 A1* | 1/2007 | Wang et al. .................. 370/258 |
| 2007/0127421 A1* | 6/2007 | D'Amico et al. ............ 370/338 |
| 2008/0268855 A1* | 10/2008 | Hanuni et al. ................ 455/445 |
| 2009/0086620 A1* | 4/2009 | Fowler et al. ................ 370/216 |
| 2010/0226260 A1* | 9/2010 | Zinjuvadia et al. ........... 370/248 |

* cited by examiner (5a)

(5b) (5c)

METHOD FOR ELECTING RING MANAGER OF RING TOPOLOGY NETWORK, AND NODE

CROSS-REFERENCE TO RELATED APPLICATION

Pursuant to 35 U.S.C. §119(a), this application claims the benefit of earlier filing date and right of priority to Korean Patent Application Number 10-2010-0042662, filed on May 6, 2010, the contents of which are hereby incorporated by reference herein in its entirety.

BACKGROUND OF THE INVENTION

1. Field of the invention

The present disclosure relates to a method for electing a ring manager of ring topology network and a node, and more particularly to a method for electing a ring manager of ring topology network, configured to enhance efficiency and reliability by allowing a most appropriate node to perform a ring manager function in response to communication load of each node in a ring network using a full duplex communication method, and a node therefore.

2. Description of Related Art

If a network is configured by directly connecting a plurality of communication devices (hereinafter referred to as "nodes") using a communication medium such as Ethernet, a failure may occur in a middle node to generate a phenomenon of interrupting communication of an entire network.

In order to prevent the phenomenon, a ring network is used capable of communicating with extra paths even if a failure occurs in the middle node.

The ring network is configured to use a full duplex communication method, where each node of the ring network can transmit packets by way of hardware logic to improve network performance. However, if the entire node is a broadcast packet of reception object, a relevant packet circulates in a limitless loop. As a measure to prevent this problem, a ring network is configured in such a manner that one or more particular nodes perform a role of a ring manager to diminish without transmission of the received packet any more.

However, there is a problem in the prior art in that the ring manager is fixed to generate an effective communication in the ring network. For example, assuming that a ring network is proposed in which nodes 1 to 10 are sequentially connected in that order, and a node 5 is selected as a ring manager.

Then, as there is realized no pack transmission in the node 5 of ring manager, such that if node 4 is to transmit a packet to node 6, the packet can be transmitted to node 6 via node 3 because transmission to node 5 cannot be realized. There is no doubt that the indirect transmission is ineffective compared with the direct transmission of packet from node 4 to node 6 via node 5, and the more packet relay counts from node 4 are, the more ineffectiveness the ring network experiences.

Particularly, the packet relay count at each node may be changed even in an operating situation, where configuration of a ring network and selection of a ring manager are completed. Therefore, even if a ring manager has been effectively selected in an initial stage of configuration of ring manager, the problem of ineffectiveness thus explained can happen at any time, if the ring manager is fixed regardless of network situation.

SUMMARY OF THE INVENTION

The present disclosure is directed to solve the abovementioned disadvantages and/or problems and it is an object of the present disclosure to provide a method for electing a ring manager of ring topology network and a node therefor, configured to enhance efficiency and reliability by allowing a most appropriate node to perform a ring manager function in response to communication load of each node in a ring network using a full duplex communication method, based on network load status that changes in real time even in the course of the ring network being set up at initial stage and operated.

Technical problems to be solved by the present disclosure are not restricted to the above-mentioned descriptions, and any other technical problems not mentioned so far will be clearly appreciated from the following description by skilled in the art.

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a method for electing a ring manager of ring topology network, comprising: requesting, by a node responsible for electing a ring manager in a ring network where a full duplex communication method is used and the ring manager is currently elected, each node diagnostic information on packet traffic and receiving the diagnostic information; using, by the node responsible for electing the ring manager, the diagnostic information received from the each node to elect a new node performing a ring manager role; and notifying, by the node responsible for electing the ring manager, information on the newly elected ring manager based on the election result to the each node.

Preferably, the node responsible for electing the ring manager is a node currently performing the ring manager in the ring network.

Preferably, the node responsible for electing the ring manager periodically receives packet traffic from each node comprising the ring network to newly elect a ring manager.

Preferably, the node responsible for electing the ring manager elects a node comprising the ring manager with least packet relay count as a ring manager.

Preferably, the ring network includes two ring managers.

Preferably, the node responsible for electing the ring manager elects as a first ring manager a node comprising the ring network with least packet relay count, and elects as a second ring manager a node among nodes connecting two communication ports of the first elected ring manager with least packet relay count.

Preferably, the step of requesting and receiving the diagnostic information further includes transmitting to each node a packet requesting the diagnostic information on packet traffic.

Preferably, the step of requesting and receiving the diagnostic information further includes activating a timer if the packet requesting the diagnostic information is transmitted.

Preferably, the step of requesting and receiving the diagnostic information further includes re-requesting each node of the diagnostic information on packet traffic if the diagnostic information on packet traffic is not received until the timer is stopped in operation.

In another general aspect of the present disclosure, there is provided a node connected to a neighboring node through at least two communication ports to form a ring network, the node comprising: a communication unit performing communication through each communication port; a collection unit requesting each node of diagnostic information on packet traffic through the communication unit if there arises a need to re-elect a ring manager, and collecting the diagnostic information transmitted by each node according to the request; an elector newly electing a node responsible for performing a ring manager using the diagnostic information of each node collected by the collection unit; and an informer informing each node of the information on the node newly elected by the elector as a ring manager through the communication unit.

Preferably, the diagnostic information includes packet relay counts, and the elector elects a node with the least packet relay count as a ring manager.

Preferably, the collection unit activates a timer if a request is made to each node on the packet traffic, and re-requests the each node of the diagnostic information on packet traffic if the diagnostic information on packet traffic is not received until the timer is stopped in operation.

Advantageous Effects

The method for electing a ring manager of ring topology network and a node according to the present disclosure have advantageous effects in that a ring manager can be elected based on network load status that changes in real time even in the course of a ring network being initially set up and operated responsive to structural conditions including positions of each node and MAC node, where election of the ring manager reflects a current packet traffic situation, such that a node most adequate to the current network situation can always perform a ring manager role in the ring network.

BRIEF DESCRIPTION OF THE DRAWINGS

The new and inventive features believed characteristics of the present disclosure are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE INVENTION

Figure 1:
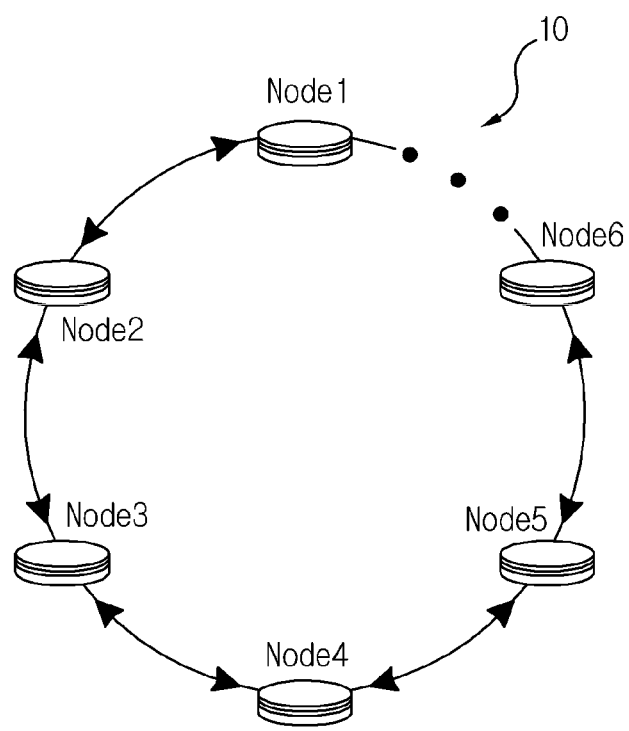
FIG. 1 is a conceptual diagram illustrating a ring network that is used in a full duplex communication method.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made. The following description is, therefore, not to be taken in a limiting sense.

The particulars shown herein are by way of example and for purposes of illustrative discussion of the embodiments of the present disclosure only and are presented in the cause of providing what is believed to be the most useful and readily understood description of the principles and conceptual aspects of the present disclosure.

In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

In the drawings, the size and relative sizes of layers and regions may be exaggerated for clarity. Like numbers refer to like elements throughout, and explanations that duplicate one another will be omitted.

Now, the exemplary embodiments of a method for electing a ring manager of ring topology network and a node according to the present disclosure will be explained in detail hereunder.

FIG. 1 is a conceptual diagram illustrating a ring network (10) where n number of nodes is connected in a ring shape.

Referring to FIG. 1, each node is formed with two communication ports where each communication port is connected to a neighboring node, and each node can transmit packets to a dual direction. The ring network (10) may be configured in various methods if necessary. For example, the ring network (10) may be configured in a full duplex Ethernet.

Referring to FIG. 1 again, if the ring network (10) is configured, structural information including hop counts of each node or MAC (Media Access Control) address may be used to elect one or more nodes as a ring manager. The ring manager does not transmit a packet transmitted to itself to a next node in order to prevent a broadcast packet from circulating in a limitless loop.

Figure 2:
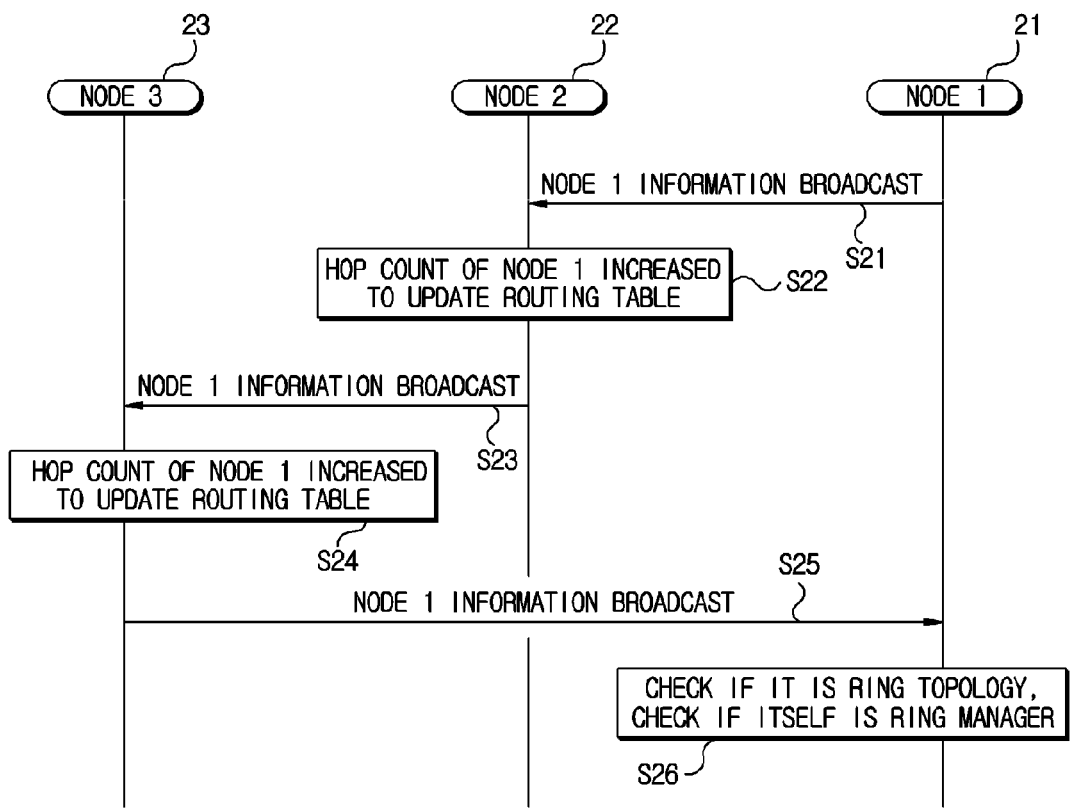
FIG. 2 is an example of a process where each node grasps information on hop count.

FIG. 2 is an example of a ring network formed with node 1 to node 3, where each node maintains a hop count-based routing table. Each of the nodes in the ring network broadcasts its information in a predetermined format. For example, node 1 (21) broadcasts information through any one of communication ports (S21).

Node 2 (22) having received the broadcast information through the any one of communication ports increases hop count on the node 1 by 1, updates its routing table and broadcasts to the other communication port (S22, S23).

Node 3 (23) having received the broadcast information of node 1 through the any one of communication ports increases by 1 the hop count on node 1, updates its routing table and broadcasts to the other communication port (S24, S25).

Given that a ring network formed with node 1 to node 3 has been assumed, the node 1 (21) now receives the information it broadcast at step S21 through a communication port of another side. Then, the node 1 (21) comes to know that a network it belongs to is a ring type, and can check if itself, the node 1 (21), is a ring manager based on hop count information (S26).

That is, if a node broadcasts a packet in a ring network, a relevant packet is received through a communication port of another side, such that if a packet sent by itself is received by the another port, itself can check or understand that itself is a ring manager.

Furthermore, if the above processes are performed on each node, the each node is made with a hop count-based routing table, and the each node can use information of the routing table to check if each node itself is a ring manager.

Meanwhile, the ring network may be categorized into two types, that is, a ring network in which a master and a slave are identified, and a ring network where a master and a slave are not identified. In a ring network of master/slave structure, a ring manager is elected from slave nodes.

Figure 3:
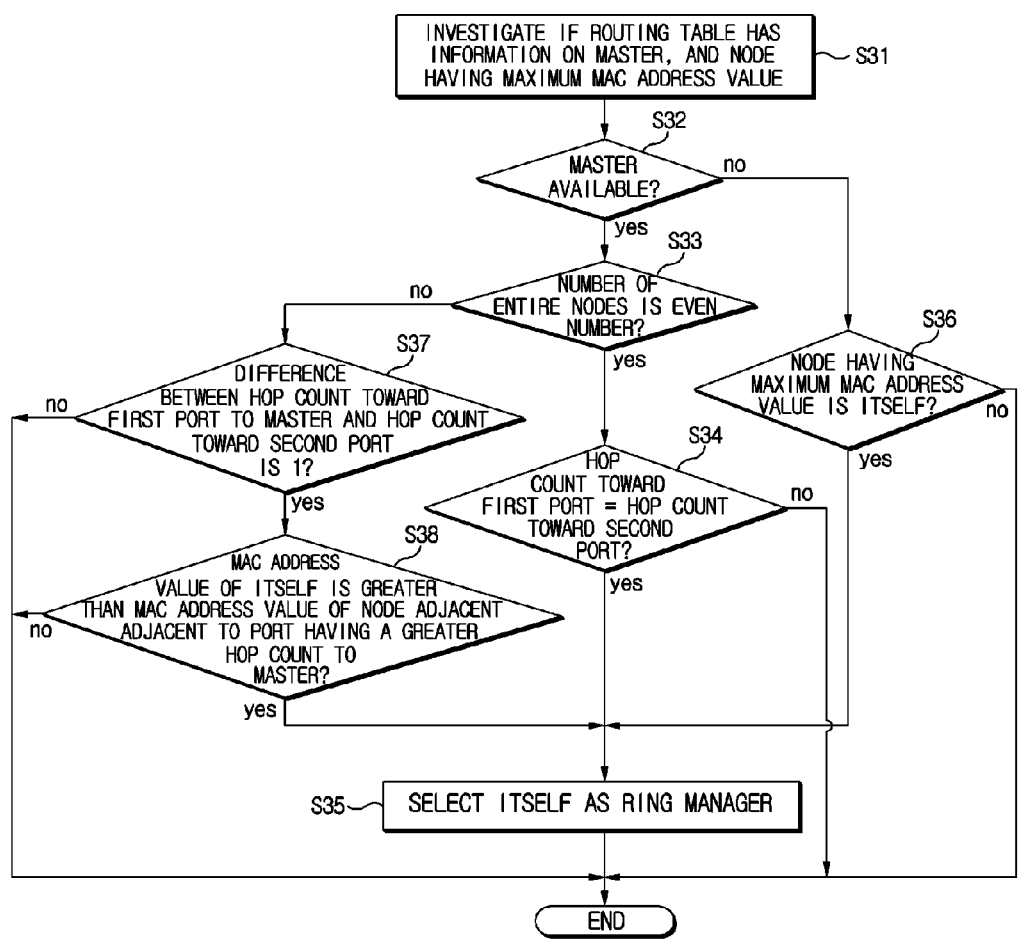
FIG. 3 is an example of a process where each node checks if itself is a ring manager.

FIG. 3 is an example of a process where each node checks if the each node itself is a ring.

Referring to FIG. 3, each node investigates its routing table to check if a master is available, and which node has a maximum MAC address (S31). As a result of investigation at S31, if the master is not available at the routing table (S32), the node itself checks if the node itself is a node having the maximum MAC address (S36), and if positive, the node elects itself as a ring manager (S35). However, as a result of investigation at S31, if it is determined that the master is available at the routing table (S32), the node determines whether the total number of nodes in the ring network is an even number or an odd number. (S33).

As a result of investigation at S33, if it is determined that the total number of nodes in the ring network is an even number, and if a hop count from one communication port to the master and a hop count from another communication port to the master are same, the node elects itself as a ring manager (S34, S35), and if negative, the node determines that the node itself is not the ring master.

As a result of investigation at S33, if it is determined that the total number of nodes in the ring network is an odd number, and if a hop count from one communication port to the master and a hop count from another communication port to the master differ by 1 (S37), and if the node's MAC address is greater than or equal to an MAC address of a node adjacent to a communication port of larger hop count (S38), the node elects itself as a ring manager (S35).

As a result of investigation at S33, a hop count from one communication port to the master and a hop count from another communication port to the master does not differ by 1 (S37), and if the node's MAC address is smaller than an MAC address of a node adjacent to a communication port of larger hop count (S38), the node determines that the node itself is not the ring master.

Figure 4:
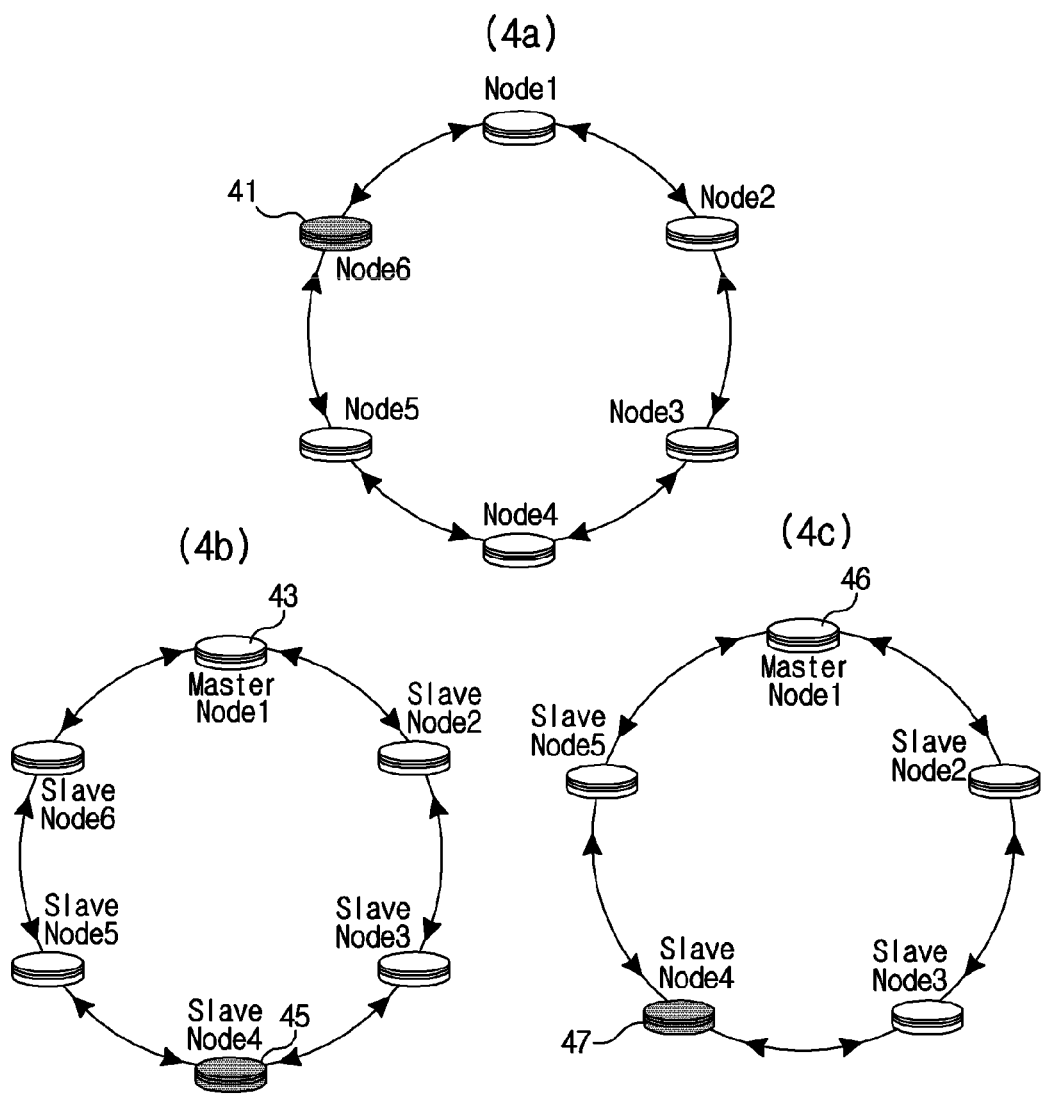
FIGS. 4 and 5 are detailed examples where a ring manager is elected in a ring network.

FIG. 4a is an example of a ring network where there is available no master. Assuming that MAC addresses from node 1 to node 6 increase in that order, the node 6 (41) elects itself as a ring manager.

FIG. 4b is an example of a ring network where the entire number of nodes is an even number, and a master (43) is available. Assuming that an MAC address from node 1 to node 6 increases in that order, the node 4 (45) elects itself as a ring manager.

Figure 5:
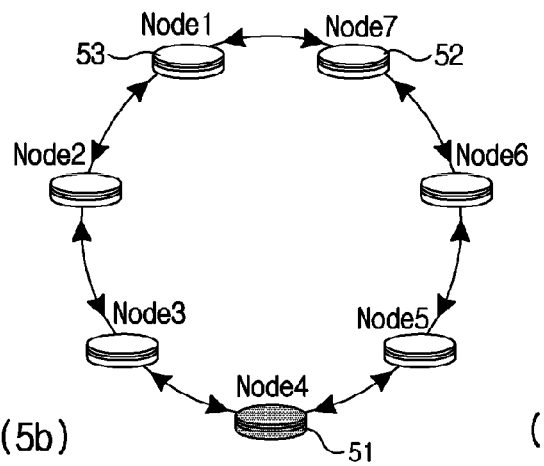
Figure 5:
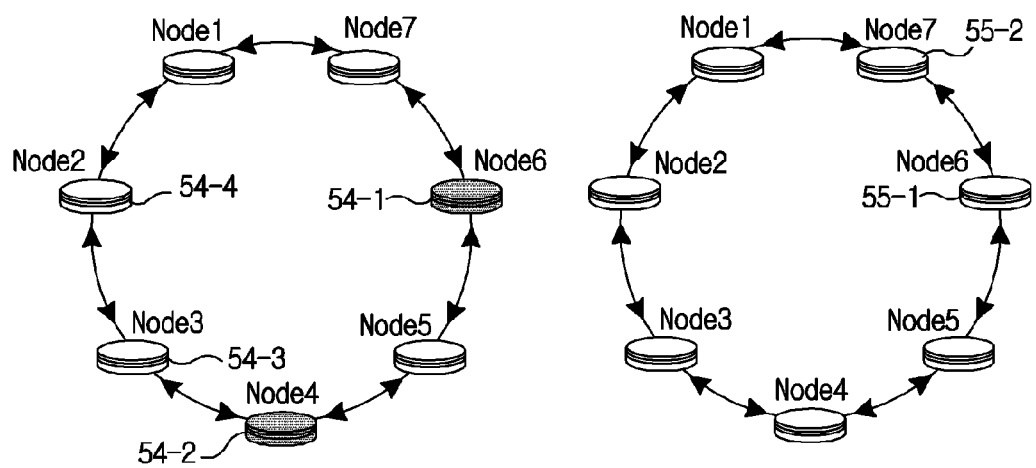

FIG. 4c is an example of a ring network where the entire number of nodes is an odd number, and a master (46) is available. If it is assumed that an MAC address from node 1 to node 5 increases in that order, the node 4 elects itself as a ring manager. Furthermore, two or more nodes may function as a ring manager, and with reference to FIG. 5, an example of electing two ring managers will be described.

Referring to FIG. 5a, ring masters may be elected from two slave nodes (52, 53) having the largest hop counts with the master (51) in a ring network formed with one master (51) and several slaves (Node1 Node3, Node5 Node7).

Referring to FIG. 5b, one slave node (54-3) having the greatest hop counts from a master node (54-2) having the smallest MAC address, and one node (54-4) among a slave nodes adjacent thereto may be selected as a ring manager in a ring network formed with a plurality of masters (54-1, 54-2) and several slaves (Node1 Node3, Node5, Node7).

Referring to FIG. 5c, one node (55-2) having the greatest MAC address and a node (55-1) adjacent thereto, may be selected as a ring manager in a ring network where there is no master/slave structure.

Figure 6:
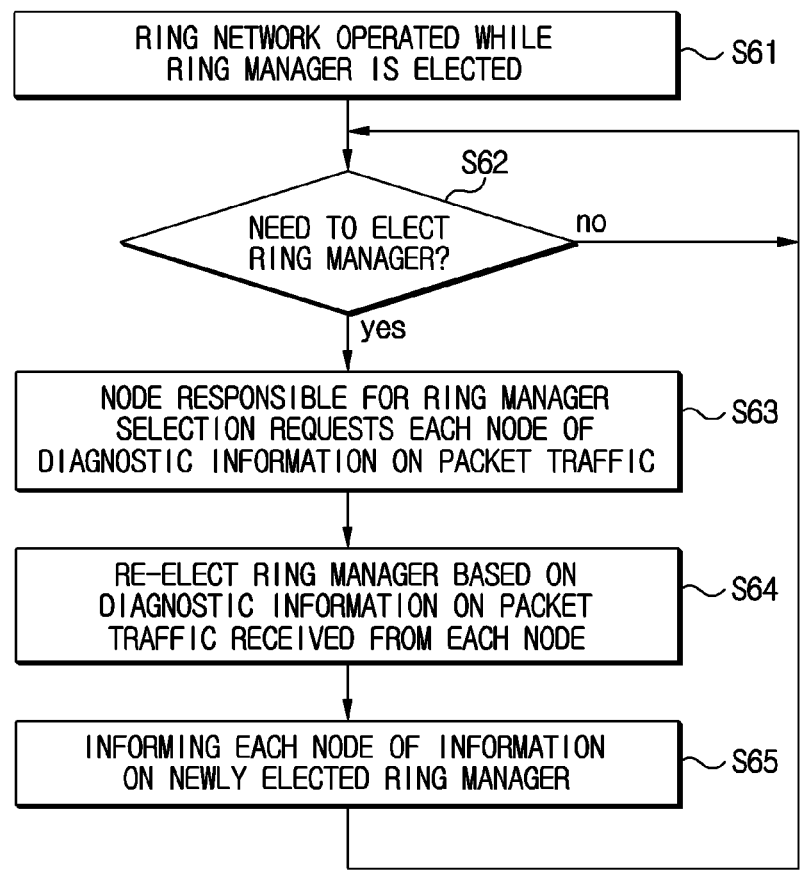
FIG. 6 is a method for electing a ring manager according to an exemplary embodiment of the present disclosure.

Referring to FIG. 6, a method for electing a ring manager in a ring network according to an exemplary embodiment of the present disclosure will be described in detail.

First of all, if a ring network is formed, an arbitrary method is employed to elect a ring manager and the ring network is started to operate (S61), one node responsible for selecting a ring master among each node that forms the ring network performs a role of re-electing a ring manager based on processes from step S62 to S65.

The node responsible for electing the ring manager defines a node taking charge of functioning to re-elect a ring manager while the ring network is being operated, and the node is being referred to hereinafter as "re-election responsible node" for convenience sake.

Various configurations may be available for whom to select a node as the re-election responsible node among nodes forming the ring network, and a node currently functioning as a ring manager may perform a role of the re-election responsible node, for example.

The re-election responsible node proceeds the processes from step S63 to S65 when there is a need of newly electing a ring manager in the midst of the ring network being operated (S62), and various configurations may be available, if need be, for which situation to be determined as a time for newly electing a ring manager.

For example, the need may include such occasions as an occasion when there is an instruction from a user, an occasion where a new path has appeared in which a large quantity of packets exceeding a predetermined reference flows, and an occasion where a packet has been received from or transmitted to a node where no packets have been ever received or transmitted. Furthermore, the ring manager election process may be repeatedly performed at each predetermined period.

The re-election responsible node may request each node of diagnostic information on packet traffic and receive the information whenever there is a need of newly electing a ring manager (S63), where the term of diagnostic information on the packet traffic means information capable of investigating communication load at each node, and may include information on packet relay count at each node, for example.

Figure 7:
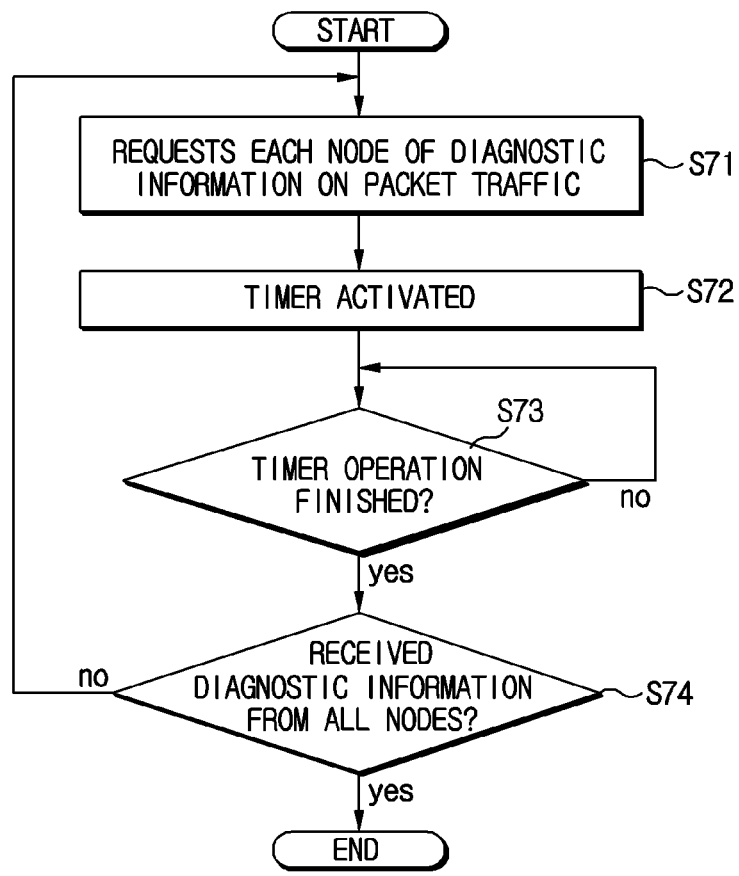
FIG. 7 is an example of a process where diagnostic information for electing a ring manager is collected.

FIG. 7 is an example of a process where diagnostic information for electing a ring manager is collected.

Referring to FIG. 7, a detailed example of process that is being executed at S63 will be described.

The re-election responsible node transmits to each node a packet requesting diagnostic information on packet traffic (S71) and activates a timer (S72).

The re-election responsible node ends the step of S63 (S73, S74), if the diagnostic information on the packet traffic that has been requested at step of S71 is received from all nodes in the ring network until the timer is stopped in operation. However, if the diagnostic information on the packet traffic that has been requested at step of S71 is not received from all nodes in the ring network until the timer is stopped in operation (S73, S74), flow advances to S71 to re-request the diagnostic information on the packet traffic.

If the diagnostic information on the packet traffic is received from all nodes in the ring network through S63, the re-election responsible node employs relevant diagnostic information to newly elect a ring manager that performs a role of a ring manager (S64). There may be various methods of electing a ring manager using relevant diagnostic information on packet traffic at step of S64, and one of the examples may be to select a node with least packet traffic as a ring manager.

Figure 8:
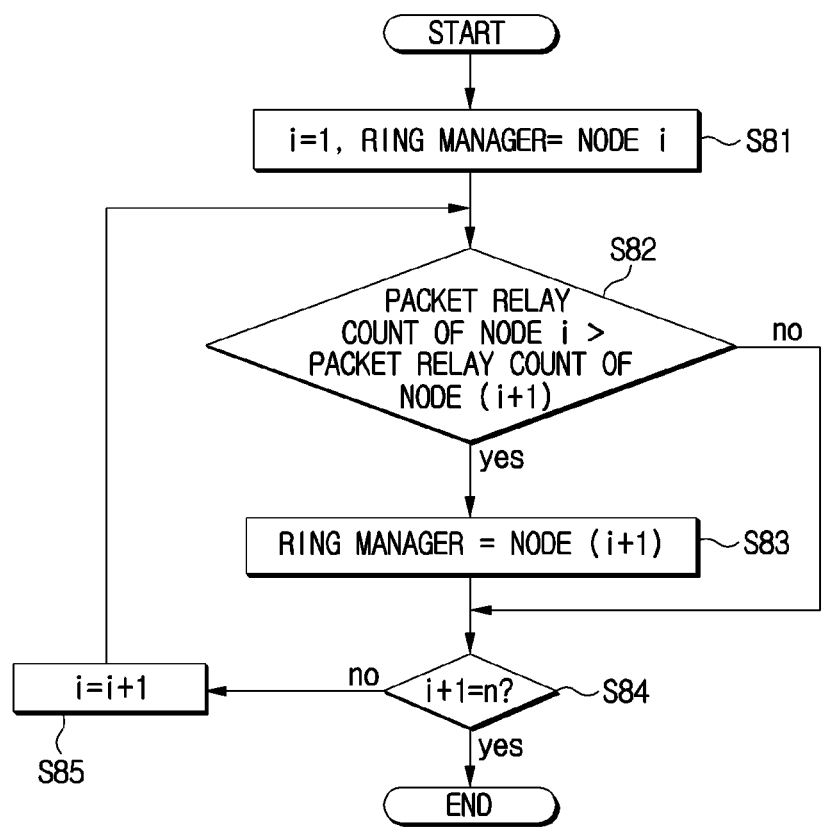
FIG. 8 is an example of a process where a ring manager is elected based on collected diagnostic information.

FIG. 8 is an example of a process where a ring manager is elected based on collected diagnostic information, where a process being performed by S64 will be described in detail.

The re-election responsible node initializes a variable (i) as 1, and temporarily determines a newly electable ring manager as a node i (S81). At this time, the ring network is assumed to have been configured with node 1 to node n.

Now, if a packet relay count of node (i) exceeds a packet relay count of a node (i+1) (S82), the node (i+1) is temporarily determined as a ring manager to be newly elected (S83).

If a value of the variable (i) is not (n−1) (S84), which means that there is an object to be investigated, the value of variable (i) is increased to proceed to step of S82 (S85), and if the value of the variable (i) is (n−1), which means that all the objects have been investigated, the step of S63 is ended. Thus, a node with the least packet relay counts can be elected as a ring manager through these processes.

The re-election responsible node that has newly elected a ring manager through step of S64 notifies each node of the information on the newly elected ring manager (S65).

At this time, if the node that has been functioning as a ring manager is the re-election responsible node, and the node newly elected at step of S64 is no less a node than the re-election responsible node itself, there occurs no change in ring manager, such that a process of notifying each node of the information on the newly elected ring manager may be omitted.

Meanwhile, the ring network may include two or more ring managers. The step of S64 may elect a node with the least packet traffic among the nodes forming the ring network as a first ring manager, and elect a node with the least packet traffic among each node connected to two ports of the first ring manager as a second ring manager.

Figure 9:
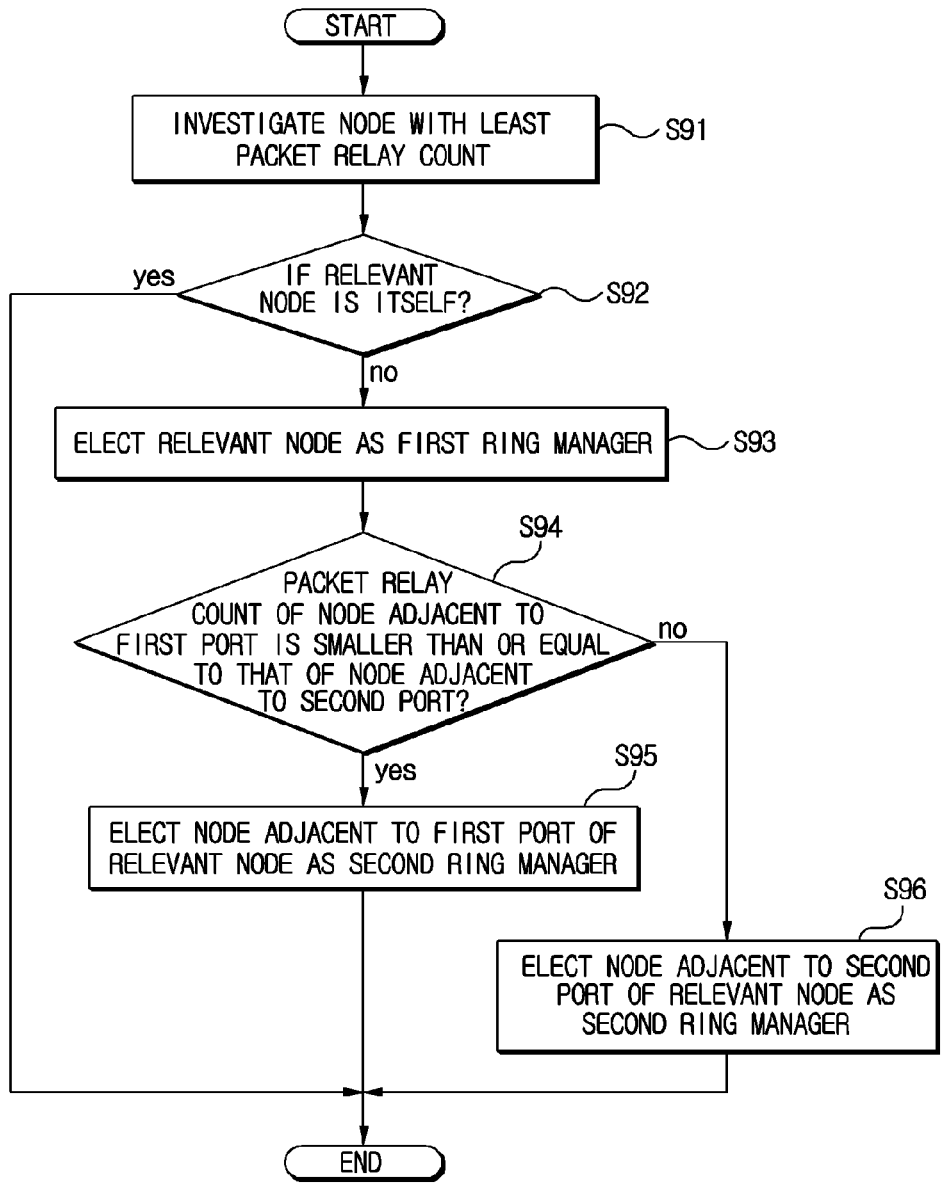
FIG. 9 is an example of a method for electing two ring managers.

Referring to FIG. 9, the re-election responsible node investigates a node (M) with the least packet relay counts based on the diagnostic information on packet traffic of each node collected through step of S63 (S91). As a result of investigation at step of S91, if the node (M) includes the re-election responsible node itself, the step of S64 is ended (S92), and if the node (M) fails to include the re-election responsible node itself, the re-election responsible node elects the node (M) as a first ring manager (S93).

Thereafter, re-election responsible node investigates packet relay counts of each node adjacent to two communication ports (first communication port and second communication port) of node (M) (S94), and elects a node with the least packet relay counts as a second ring manager (S95, S96). That is, if a packet relay count of a node adjacent to the first communication port is smaller than or equal to a packet relay count of a node adjacent to the second communication port, the re-election responsible node elects the node adjacent to the first communication port of node (M) as a second ring manager (S95). If a packet relay count of a node adjacent to the first communication port is greater than a packet relay count of a node adjacent to the second communication port, the re-election responsible node elects the node adjacent to the second communication port of node (M) as a second ring manager (S96).

Figure 10:
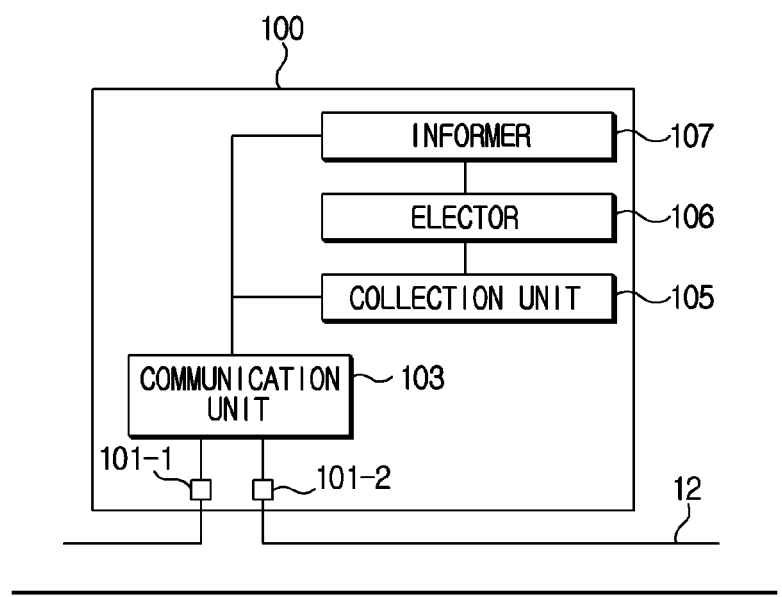
FIG. 10 is a functional block diagram illustrating a node according to the present disclosure.

FIG. 10 is a functional block diagram illustrating a node according to the present disclosure.

Referring to FIG. 10, a node (100) according to the present disclosure may be connected to an adjacent node through at least two communication ports (101-1, 101-2) to form a ring network, and in order to perform the ring manager election function, the node (100) may include a communication unit (103), a collection unit (105), an elector (106) and a informer (107).

The first communication port (101-1) and the second communication port (101-2) are connected to adjacent nodes through a physical circuit (12) such as Ethernet. The communication unit performs communication through each communication port according to communication method of a ring network. The collection unit (105) requests each node of diagnostic information on packet traffic through the communication unit (103) if there is a need to re-elect a ring manager, and collects the diagnostic information transmitted by each node according to the request.

Various configurations may be implemented as to under what circumstances a ring manager is nearby elected. For example, the need may include such occasions as an occasion when there is an instruction from a user, an occasion where a new path has appeared in which a large quantity of packets exceeding a predetermined reference flows, and an occasion where a packet has been received from or transmitted to a node where no packets have been ever received or transmitted. Furthermore, the ring manager election process may be repeatedly performed at each predetermined period. The term of diagnostic information on the packet traffic means information capable of investigating communication load at each node, and may include information on packet relay count at each node, for example.

The elector (106) newly elects a node responsible for performing a ring manager using the diagnostic information of each node collected by the collection unit (105). There may be various methods of electing, by the elector (106), a ring manager using diagnostic information on packet traffic, and one of the examples may be to elect a node with least packet traffic as a ring manager.

The informer (107) performs a function of informing each node of the information on the node newly elected by the elector (106) as a ring manager through the communication unit (103).

If the ring manager newly elected by the elector (106) is no less a node than the relevant node (100) itself, there occurs no change in ring manager, such that a process of notifying each node of the information on the newly elected ring manager may be omitted.

The above-mentioned foregoing embodiments according to the present disclosure may, however, be embodied in many different forms and should not be construed as limited to the exemplary embodiments set forth herein. Thus, it is intended that embodiments of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

INDUSTRIAL APPLICABILITY

The method for electing a ring manager of ring topology network and a node according to the present disclosure have an industrial applicability in that a ring manager can be elected based on network load status that changes in real time even in the course of a ring network being initially set up and operated responsive to structural conditions including positions of each node and MAC node, where election of the ring manager reflects a current packet traffic situation, such that a node most adequate to the current network situation can always perform a ring manager role in the ring network.

What is claimed is:

1. A method for electing at least one new ring manager of a ring network, the method comprising:
   updating a routing-table in each of a plurality of nodes of the ring network, each routing table updated via a corresponding node of the plurality of nodes and including status information of each of the plurality of nodes;
   requesting node diagnostic information via one of the plurality of nodes that is responsible for electing the at least one new ring manager, the node diagnostic information requested from each of the other plurality of nodes, the node diagnostic information related to an amount of packet traffic processed by the corresponding node and including a packet relay count;
   receiving the requested node diagnostic information;
   determining a communication load of each of the other plurality of nodes based on the received node diagnostic information;
   electing at least one node of the plurality of nodes that processed a smallest amount of packet traffic as the at least one new ring manager based on the determined communication loads, the at least one node elected via the one node responsible for electing the at least one new ring manager; and
   notifying each of the other plurality of nodes of the at least one node elected as the at least one new ring manager, the notification communicated via the one node responsible for electing the at least one new ring manager.

2. The method of claim 1, wherein the one node responsible for electing the at least one new ring manager is a currently elected ring manager.

3. The method of claim 1, wherein the node diagnostic information is received periodically.

4. The method of claim 1, wherein the at least one node of the plurality of nodes that processed the smallest amount of packet traffic has a smallest packet relay count.

5. The method of claim 1, wherein the one node responsible for electing the at least one new ring manager is configured to elect a first ring manager and a second ring manager.

6. The method of claim 5, further comprising:
   electing the at least one node of the plurality of nodes that processed the smallest amount of packet traffic as the first ring manager;
   electing a node of the plurality of nodes that processed a next smallest amount of packet traffic and that is connected to two communication ports of the elected first ring manager as the second ring manager.

7. The method of claim 1, wherein requesting the node diagnostic information comprises:
   activating a timer; and
   re-requesting the node diagnostic information when the requested node diagnostic information is not received before the timer expires.

8. A node of a ring network that is connected to a neighboring node of a plurality of nodes of the ring network through at least two communication ports, the node comprising:
   a memory configured to store and update a routing-table of the node, the routing table including status information of each of the plurality of nodes;
   a communication unit configured to communicate through each of the at least two communication ports;
   a collection unit configured to:
      request node diagnostic information from each of the other plurality of nodes in order to elect at least one new ring manager of the ring network, the node diagnostic information related to an amount of packet traffic processed by the corresponding node and including a packet relay count;
      receive the requested node diagnostic information; and
      determine a communication load of each of the other nodes based on the received node diagnostic information;
   an elector configured to elect at least one node of the plurality of nodes that processed a smallest amount of packet traffic as the at least one new ring manager based on the determined communication loads; and
   an informer configured to notify each of the other plurality of nodes of the at least one node elected as the at least one new ring manager, the notification communicated via the communication unit.

9. The node of claim 8, wherein:
   the at least one node of the plurality of nodes that processed the smallest amount of packet traffic has a smallest packet relay count.

10. The node of claim 8, wherein the collection unit is further configured to:
   activate a timer upon requesting the diagnostic information; and
   re-request the node diagnostic information when the requested node diagnostic information is not received before the timer expires.

* * * * *